(12) United States Patent
Stehle

(10) Patent No.: US 12,121,832 B2
(45) Date of Patent: Oct. 22, 2024

(54) FILTER DEVICE

(71) Applicant: RT-FILTERTECHNIK GMBH, Friedrichshafen (DE)

(72) Inventor: Gerhard Stehle, Constance (DE)

(73) Assignee: RT-FILTERTECHNIK GMBH, Friedrichshafen (DE)

( * ) Notice: Subject to any disclaimer, the term of this patent is extended or adjusted under 35 U.S.C. 154(b) by 460 days.

(21) Appl. No.: 17/628,311

(22) PCT Filed: Jul. 14, 2020

(86) PCT No.: PCT/EP2020/069889
§ 371 (c)(1),
(2) Date: Jan. 19, 2022

(87) PCT Pub. No.: WO2021/013638
PCT Pub. Date: Jan. 28, 2021

(65) Prior Publication Data
US 2022/0258077 A1    Aug. 18, 2022

(30) Foreign Application Priority Data

Jul. 25, 2019 (DE) ..................... 10 2019 005 323.0
Jul. 25, 2019 (DE) ..................... 10 2019 005 324.9
(Continued)

(51) Int. Cl.
*B01D 29/23* (2006.01)
*B01D 29/60* (2006.01)
(Continued)

(52) U.S. Cl.
CPC .......... *B01D 29/23* (2013.01); *B01D 29/606* (2013.01); *B01D 35/0276* (2013.01);
(Continued)

(58) Field of Classification Search
None
See application file for complete search history.

(56) References Cited

U.S. PATENT DOCUMENTS 4,654,140 A    3/1987    Chen

FOREIGN PATENT DOCUMENTS

DE          2 335 276        2/1974
DE    10 2011 005 943        9/2012
(Continued)

OTHER PUBLICATIONS

International Search Report (ISR) issued Sep. 28, 2020 in International (PCT) Application No. PCT/EP2020/069889.

*Primary Examiner* — Krishnan S Menon
(74) *Attorney, Agent, or Firm* — WENDEROTH, LIND & PONACK, L.L.P.

(57) ABSTRACT

A filter device has a filter housing (14) with a housing pot (12), which accommodates a replaceable filter element (16) and is closed by a removable lid part (32). The element material (20) of the filter element (16) separates an unfiltrate chamber (22) from a filtrate chamber (18, 43). A measurement sensing device (108) senses pressure values from at least one of the chambers (18, 22, 43), is disposed on a lid inner side (45) of the lid part (32), is at least partially guided in the lid part, and projects into the filter housing (14). At least parts of a measurement value evaluator (78) are connected to the measurement sensing device (108) and are disposed on the opposite lid outer side (42) facing the environment.

11 Claims, 4 Drawing Sheets

(30) Foreign Application Priority Data

Jul. 25, 2019 (DE) ...................... 10 2019 005 325.7
Jul. 25, 2019 (DE) ...................... 10 2019 005 326.5

(51) Int. Cl.
*B01D 35/027* (2006.01)
*B01D 35/147* (2006.01)
*B01D 35/30* (2006.01)

(52) U.S. Cl.
CPC ........... *B01D 35/147* (2013.01); *B01D 35/30* (2013.01); *B01D 2201/0423* (2013.01); *B01D 2201/291* (2013.01); *B01D 2201/295* (2013.01); *B01D 2201/304* (2013.01); *B01D 2201/305* (2013.01); *B01D 2201/309* (2013.01); *B01D 2201/4007* (2013.01); *B01D 2201/4015* (2013.01); *B01D 2201/4084* (2013.01)

(56) References Cited

FOREIGN PATENT DOCUMENTS

| | | |
|---|---|---|
| DE | 10 2015 003 604 | 9/2016 |
| DE | 10 2016 006 833 | 12/2017 |
| DE | 10 2016 013 588 | 5/2018 |
| DE | 10 2017 011 523 | 6/2019 |
| EP | 2 201 993 | 6/2010 |
| JP | 2009-214003 | 9/2009 |
| WO | 2004/080568 | 3/2004 |
| WO | 2008/030707 | 3/2008 |
| WO | 2015/173624 | 11/2015 | ns
FILTER DEVICE

FIELD OF THE INVENTION

The invention relates to a filter device having a filter housing, including a housing pot, which accommodates a replaceable filter element and is closed by a removable lid part. The element material of the filter element separates an unfiltrate chamber from a filtrate chamber. A measurement sensor senses pressure values from at least one of the chambers.

BACKGROUND OF THE INVENTION

Filter devices of this type in a variety of embodiments and having replaceable filter elements that comply with different specifications are state of the art. The filter elements are used in such filtering devices for the maintenance of fluids, in particular in hydraulic systems. To ensure the operational safety of the plants concerned, wherein the operational safety essentially depends on the flawless performance of the filter devices, the filter elements concerned are frequently monitored for their dirt-holding capacity. As stated in the document DE 10 2015 003 604 A1, which discloses a filter device of the genus mentioned above, the differential pressure between the unfiltrate side and the filtrate side is measured to monitor the dirt holding capacity of the known filter device to avoid the risk of operational malfunctions or even damage due to the filter medium being overloaded, which can entail considerable economic losses in expensive systems.

In the known solution mentioned above, which is designed as an in-tank filter device, the filter housing has a filter head, on the outer circumference of which there is a mounting flange. The mounting flange can be used to attach the filter head to the rim of a tank opening in such a way that a further housing part in the form of an outflow pipe, which adjoins the lower end of the filter head, extends into the interior of the tank concerned. The filter head has a radially projecting connection area on the mounting flange for the contamination indicator sensor. The sensor, having a measuring housing in the form of an elongated cartridge, extends, relative to the longitudinal axis of the device, radially outwards from the connection area.

SUMMARY OF THE INVENTION

Based on this state of the art, the invention addresses the problem of providing a filter device of the genus mentioned above, which is of simple design and can be manufactured inexpensively and which enables the degree of contamination to be determined in a particularly advantageous manner.

According to the invention, this problem is solved by a filter device having, as t an essential feature of the invention, a measurement sensing device being disposed on a lid inner side of the lid part and at least partially guided therein, and projecting into the filter housing, with at least parts of a measured value evaluator connected to the measurement sensing device disposed on the opposite lid outer side facing the environment.

In the known solution, in which the measuring housing extends laterally away from the filter head along the top side of a concerning tank wall, accessibility is limited in comparison. As a particular advantage, the arrangement of the measurement sensing device on the inner side of the lid and the arrangement of at least parts of the measured value evaluator on the outer side of the lid provides the option of designing the filter device as an in-tank filter device in a particularly cost-effective and simple design. Because the measurement sensing device projects from the lid part into the interior of the filter housing, the filter device can be designed as an in-tank filter with a pressure value sensing function without a filter head in such a way that the lid part itself forms both the mounting flange on the tank wall and the mount for the assigned end of the housing pot completing the filter housing. The filter device with pressure value sensing function can then be manufactured cost-effectively in a particularly simple design.

In an advantageous exemplary embodiment, provision is made for the measurement sensing device to have a sensor channel, which is at least partially encompassed by a sensor tube, which, extending coaxially to the longitudinal axis of the filter element, fluidically connects one of the spaces of the filter element on the inner surface of the lid to a receiving space on the outer surface of the lid. The receiving space is part of the measured value evaluator. This means that the measurement sensing device and the measured value evaluator can be directly interconnected in the shortest possible way.

In a further advantageous exemplary embodiment, provision is made for the longitudinal axis of the receiving space to extend transverse to the longitudinal axis of the filter element on the outer surface of the lid and to be used for receiving a pressure sensor or a connecting piece for a pressure sensor located outside the receiving space, each as parts of the measured value evaluator. As a result, the pressure sensor or the connecting piece can be mounted on the lid part in a space-saving manner, at least in the axial direction of the lid part. In addition, by rotating the filter device prior to assembly at the respective place of use, any desired orientation of the receiving space can be preset, which enables an easy assembly and disassembly of the pressure sensor or the connecting piece at the respective place of use.

In a further advantageous exemplary embodiment, provision is made for the sensor tube to pass through a bypass valve connecting the unfiltrate side to the filtrate side when the element material of the filter element is blocked, and whose valve spring extends between the inner side of the lid and a valve member, which, in the unblocked state, closes a frontal opening of the filter element. As a result, the fluid pressure of the unfiltered matter present at the bypass valve, in particular at the valve closing member of the bypass valve, can be easily transmitted to the measured value evaluator.

In a further advantageous exemplary embodiment, provision is made for the respective parts of the measured value evaluator used in the receiving space to be designed as screw-in cartridges. This means that the parts of the measured value evaluator designed as screw-in cartridges can be installed on and removed from the lid part quickly and easily.

In a further advantageous exemplary embodiment, provision is made for the receiving space to have a channel section in parallel to its longitudinal axis, into which one free end of the sensor channel opens and which establishes a permanent connection to an evaluation channel leading to the pressure sensor. The channel section aligned in parallel to the longitudinal axis of the receiving space permits the pressure of the unfiltered matter tapped by the measurement sensing device, in particular by the sensor channel of the measurement sensing device, to be throttled on the fluid path to the measured value evaluator.

In a further advantageous exemplary embodiment, provision is made for a further sensor channel to be guided in the lid part. This further sensor channel is routed in a fluid-conveying manner to the outer side of the filter element to one of the two chambers and can be closed if necessary. As a result, the pressure on the filtrate side of the filter element can be transmitted to a differential pressure sensor for measuring the differential pressure.

In a further advantageous exemplary embodiment, provision is made for the lid-side end of the further sensor channel to open out into the receiving space in the lid part, into which the front end of the pressure sensor engages. As a result, the front end of the differential pressure sensor can be directly exposed to the pressure of the filtrate side.

In a further advantageous exemplary embodiment, provision is made for the pressure sensor to be a dynamic pressure sensor or a differential pressure sensor. While for a differential pressure measurement, the pressure of the unfiltered matter is effective via the channel section of the receiving space, aligned in parallel to the longitudinal axis of the receiving space, at the sensor. The filtrate pressure is effective via the further sensor channel at the front end of the sensor. The dynamic pressure sensor only measures the pressure values from the sensor channel passing through the bypass valve, while the differential pressure sensor measures the pressure values from both sensor channels, of which the further sensor channel is permanently connected to the filtrate side in a fluid-conveying manner. In the case of dynamic pressure measurement, the further sensor channel can advantageously be closed by the end face, in this case is designed as a plug, of the screw-in cartridge of the sensor or of the connecting piece.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

With reference to the attached drawings, the invention is explained based on examples of an in-tank filter device. For installation in a fluid container or tank not shown in the figures, such devices have a mounting flange, by which they can be attached to a wall opening on the top wall of the corresponding tank such that an outflow pipe or housing pot extends vertically into the interior of the tank. The design and function of such an in-tank filter device is described in DE 10 2015 003 604 A1, which is known from the prior art.

Figure 1:
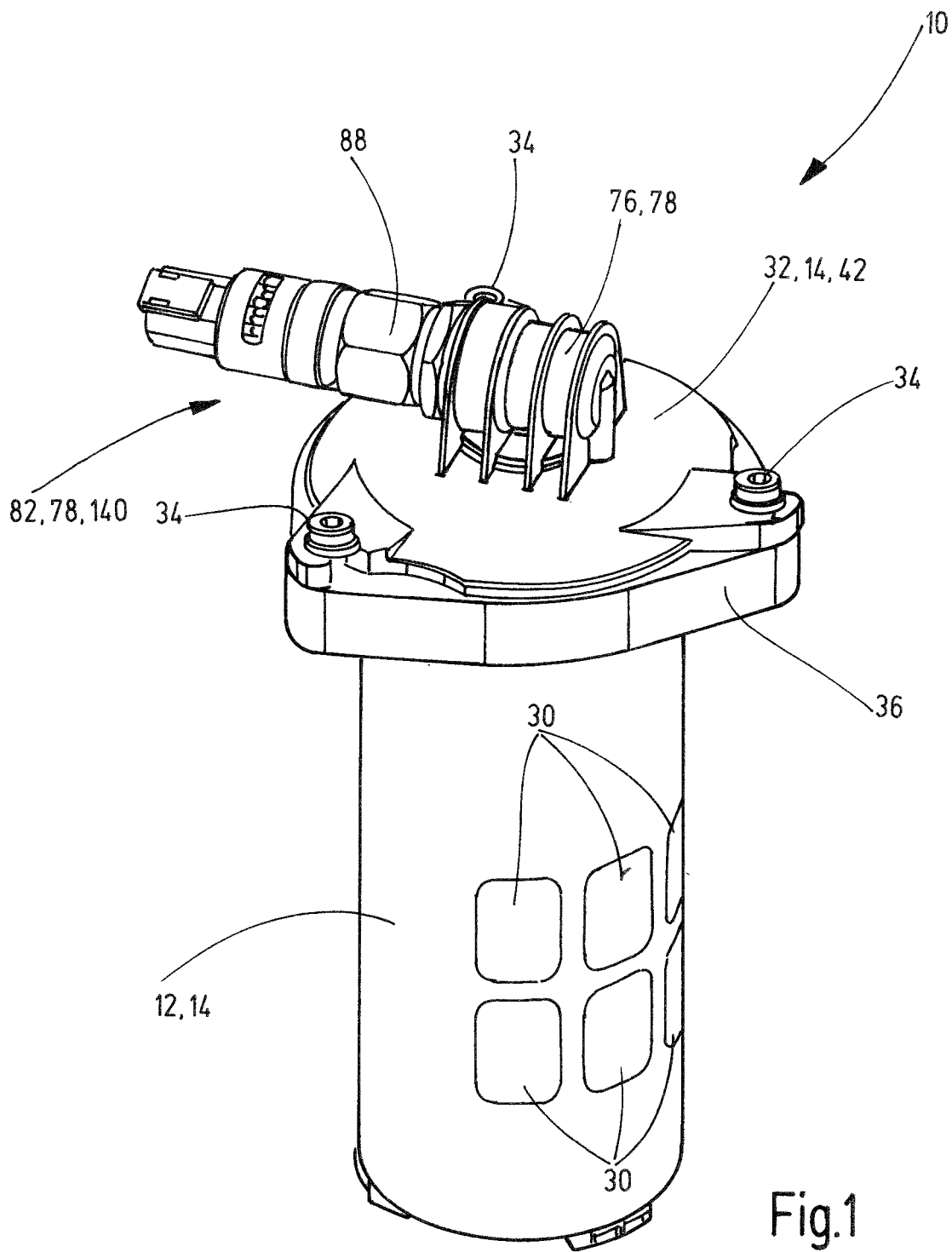
FIG. 1 is a perspective view of an exemplary embodiment of a filter device according to the invention.
Figure 2:
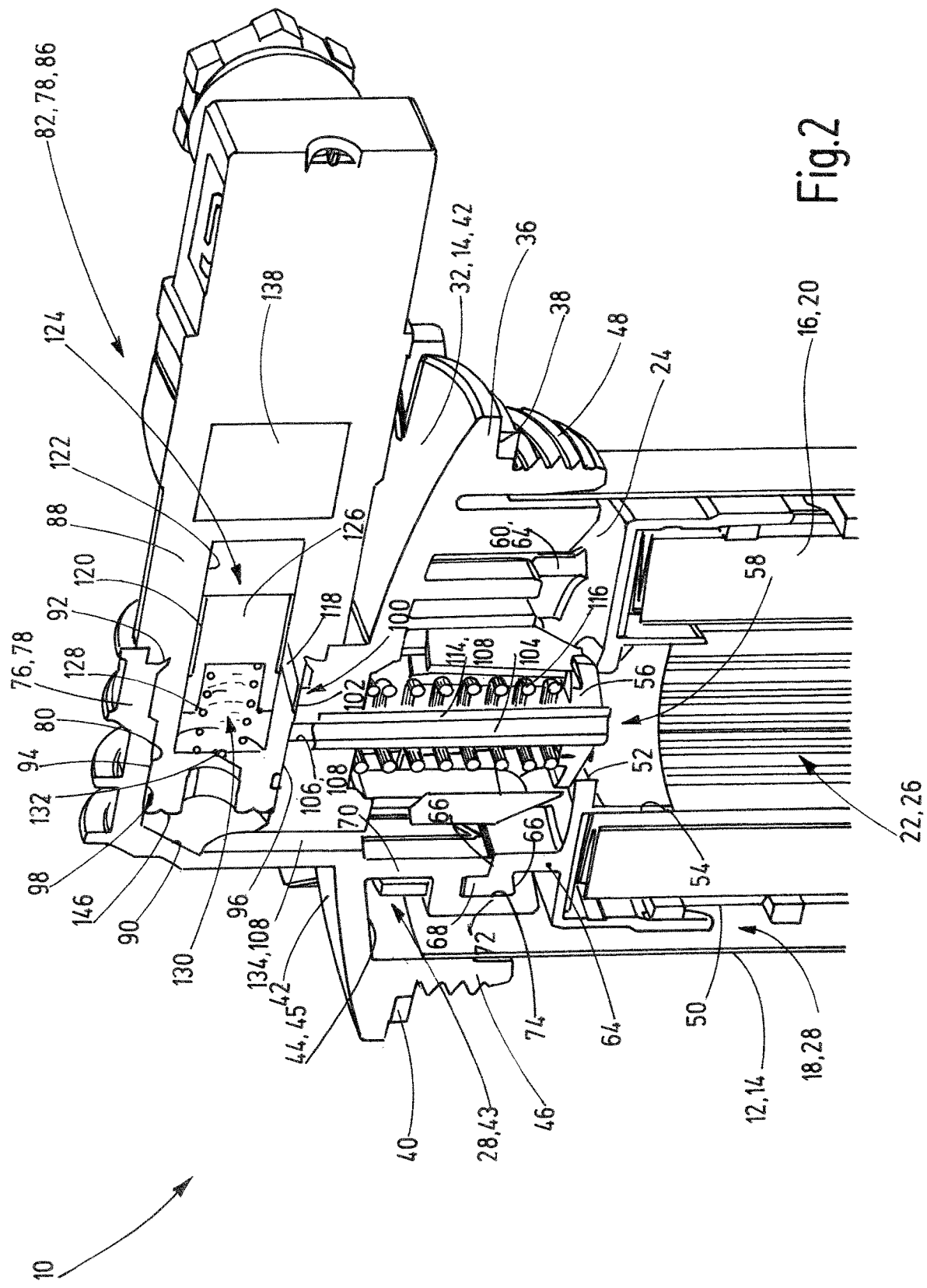
FIG. 2 is a partial perspective view in section in a central vertical section plane of only the upper end area of a filter device according to a first exemplary embodiment of the invention.
Figure 3:
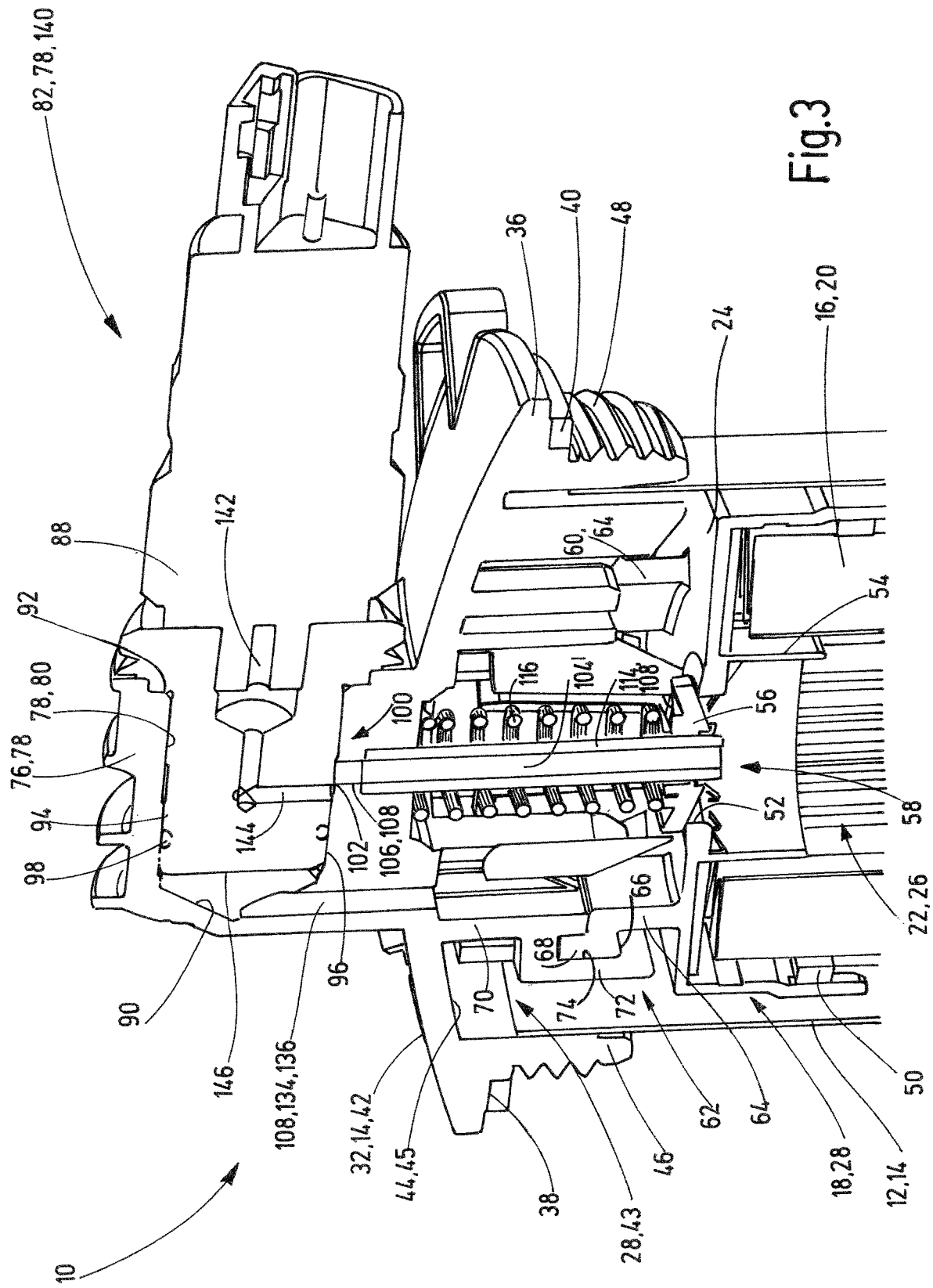
FIG. 3 is a partial perspective view of a filter device according to a second exemplary embodiment of the invention.
Figure 4:
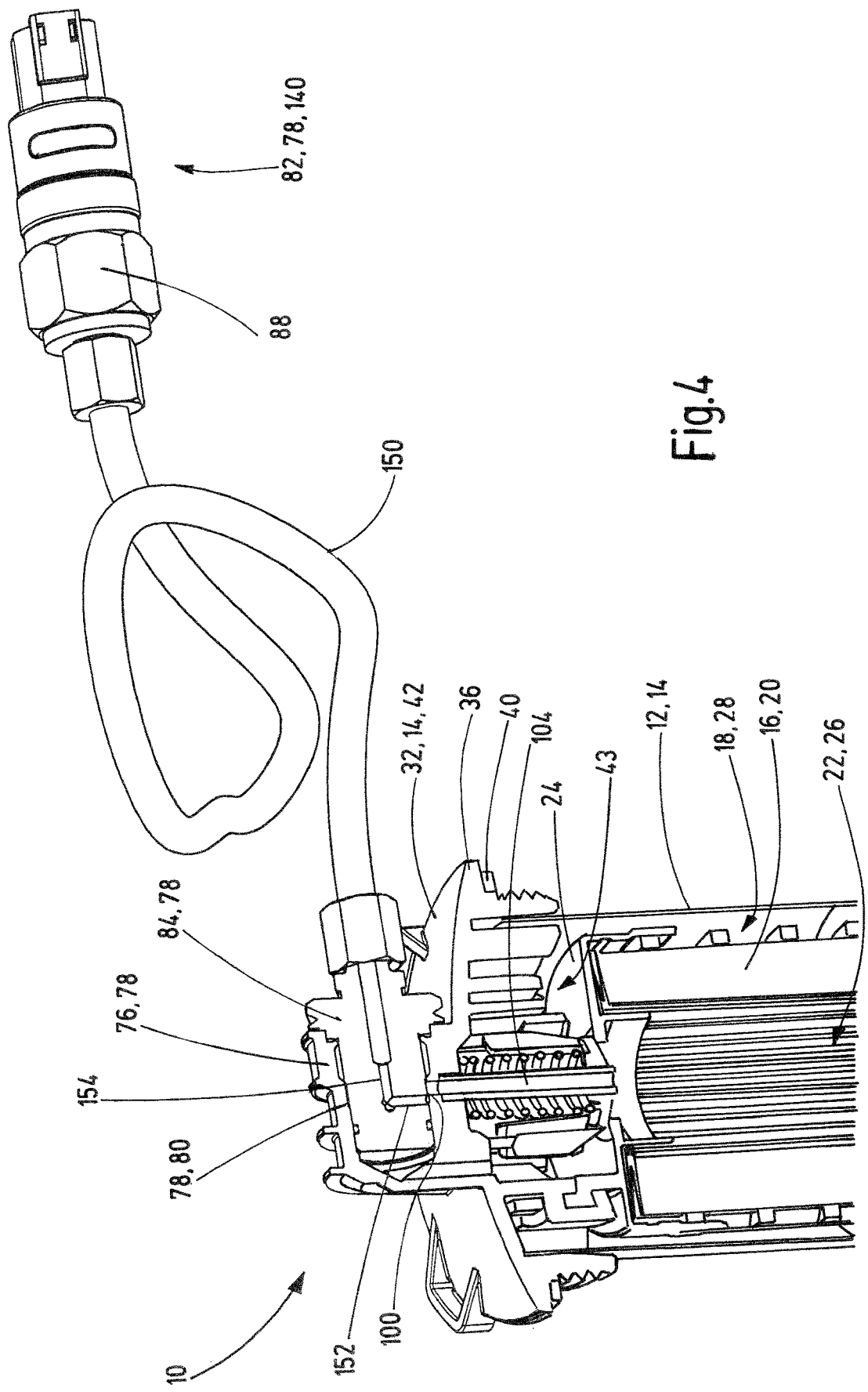
FIG. 4 is a partial perspective view of a filter device according to a third exemplary embodiment of the invention.

In FIGS. 1 to 4, in the usual manner for in-tank filter devices 10, a housing pot 12 forms a part of the filter housing 14, which accommodates a replaceable filter element 16 in such a way that the housing pot 12 circumferentially encompasses the filter element 16, forming an interstice 18. In FIGS. 2 to 4, only the upper end section of the filter element is visible in the drawing. The hollow cylindrical filter material 20 of the filter element 16, which encompasses a filter cavity 22, extends in the usual manner between two end caps 24, of which only the upper end cap 24 is visible in FIGS. 2 to 4. In the in-tank filtration mode, where the unfiltered matter is routed to the inner filter cavity 22 via the lower end cap not shown in the figures, the inner filter cavity 22 forms the unfiltrate side 26, while the interstice 18 on the outer surface of the filter material forms the filtrate side 28. From there, the filtrate passes through window openings 30 in the housing pot 12 into the interior of the tank.

At the top surface, the filter housing 14 is closed by a lid part 32, which in the variant shown in FIG. 1 is connected to a mounting flange 36 via screws 34.

In the exemplary embodiments of FIGS. 2 to 4, the lid part 32 and the fastening flange 36 are integrally formed. On its side facing the housing pot 12, in particular the surface 38, the fastening flange 36 is adjoined by a sealing ring 40, which encompasses the lid part 32 and by which the fastening flange 36 can be sealed with respect to the tank wall when the lid part 32 is screwed into an opening in the tank wall, not shown in the figures.

The lid part 32, which in conjunction with the housing pot 12 forms the overall filter housing 14, has an, in particular slightly, convexly shaped outer surface 42 and co-delimits an interior space 43. The trough-shaped ceiling 44 of the lid part 32 has a convex curvature on the inner side of the lid 45 matching the curvature of the outer side. In FIGS. 1 to 4, the upper end section of the housing pot 12 is guided along an inner side of a circular cylindrical wall 46 of the lid part 32, which also co-delimits the interior space 43. Alternatively, the housing pot 12 may be attached to the inner side of the wall 46, for example glued to the wall 46. In continuation of the interstice 18, the interior space 43 of the lid part 32 in filtration operation forms the filtrate side 28. A thread 48 is provided on the outer surface of the wall 46 for screwing in the lid part 32 into the opening in the tank wall.

The upper end cap 24 of the filter element 16, which in the usual manner forms an enclosure for the upper end of the filter material 20 and the upper end of a support tube 50 in the form of a grid-shaped support structure contacting the outer side of the filter material 20, has a central opening 52 on its planar top surface. At the bottom, the opening 52 is encompassed by a connector 54 protruding into the inner filter cavity 22 of the filter element 16. The rim of the central opening 52 forms the sealing seat for a closing body 56 of a bypass valve 58. The closing body 56 closes the passage formed at the connector 54, between the inner filter cavity 22 and the inner cavity 43 co-delimited by the lid part 32. At its top surface, the end cap 24 has a locating device 60 that interacts with a holding device 62 of the lid part 32 for positionally holding the filter element 16 in the installed position, wherein the holding device 62 extends through the interior 43 of the lid part 32 away from the lid part 32. The locating device 60 has three locating bars 64 projecting upwards from the top side of the end cap 24, wherein the locating bars 64 are 120° offset from each other near the circumference of the top side, and two of the locating bars 64 are visible in FIGS. 2 to 4. The locating bars 64 each have the shape of a circular cylinder section coaxial with the longitudinal axis of the device and, as can be seen from the locating bar 64 located on the left side in FIGS. 2 to 4, are offset to merge with radial stepped surfaces 66 into a radially outwardly offset upper end strip 68. The assigned holding device 62, which extends away from the ceiling 44 of the lid part 32 into the interior 44, has for each of the locating bars 64 a holding body 72, which is connected to the ceiling 44 via a foot part 70 and has a coaxial, inner guide link 74, into which the end strip 68 of the locating bar 64 can be inserted by a relative rotary motion between the filter element 16 and the lid part 32. In the engaged position, a type of bayonet lock is formed, in which the step surfaces 66, in conjunction with the wall surfaces of the guide link 74, form a form-fitting axial retainer of the filter element 16.

The exemplary embodiment of FIG. 2 has an attachment 76 disposed centrally on the top surface of the lid part 32, wherein in the attachment 76 a receiving space 80 for a pressure sensor 82 or a connecting piece 84 (FIG. 4) for a pressure sensor 82 located outside the receiving space 80, is provided as part of a measured value evaluator 78. By pressure sensor 82 the degree of contamination of the filter element 16 can be determined. The sensor 82 shown in FIG. 2, is a differential pressure sensor 86 having a sensor housing 88 in the form of a screw-in cartridge. The respective pressure sensor 82 and, if applicable, the connecting piece 84 are also part of the measured value evaluator 78.

The receiving space 80 is in the form of a channel having a longitudinal axis extending radially perpendicular to the longitudinal axis of the filter device, and having a closed end 90 radially offset from the longitudinal axis of the lid part 32 or the filter element 16, and an open end 92, through which the sensor housing 88 or the connecting piece 84 can be inserted into the receiving space 80. Near the closed end 90 of the channel, the receiving space 80 has a female threaded section 94 into which the male threaded section 96 of the sensor housing 88 or the connecting piece 84 can be screwed. A sealing ring 98 seals the sensor housing 88 or the connecting piece 84 from the receiving space 80. To the female threaded section 94 of the receiving space 80, a connecting channel section 100 adjoins, in which the pressure value of the unfiltrate pressure is transmitted to the sensor 32. To form the corresponding fluid connection through the connecting channel section 100, the receiving space 80 has a wall recess that forms a transverse channel 102 extending along the inner wall of the receiving space 80.

For the transmission of pressure values to the connecting channel section 100, a sensor channel 104 opens out into the transverse channel 102. The sensor channel 104, starting from a drilled hole 106 centrally located in the lid part 32, as part of a measurement sensing device 108, extends coaxially to the longitudinal axis of the filter device and passes through the valve member 56 of the bypass valve 58 and is in that way directly connected to the cavity 22 of the filter element 16 containing unfiltered matter. Starting from the drilled hole 106, the sensor channel 104 is formed by a sensor tube 114, also as part of the measurement sensing device or measurement sensor 108, in the form of a guide sleeve, on which the valve member 56 of the bypass valve 58 is guided in an axially movable manner. The valve member 56 in the form of the plate-shaped closing body is pre-loaded into the closed position sealing at the rim of the opening 52 of the end cap 24, by a valve spring in the form of a compression spring 116 encompassing the sensor tube 114, such that an front opening of the filter element 16 is closed in the unblocked state of the filter element 16. The compression spring 116, in particular a helical compression spring, is clamped between the valve member 56 and the ceiling 44 of the lid part 32. When the element material 20 of the filter element 16 is blocked, the valve member 56 is lifted against the spring force of the compression spring 116 from the valve seat, namely from the rim of the opening 52 of the upper end cap 24, by the fluid pressure on the unfiltrate side 26, whereby the bypass valve 58 connects the unfiltrate side 26 to the filtrate side 28.

In the exemplary embodiment of FIG. 2 with differential pressure measurement, the sensor housing 88, in a position aligned with the connecting channel section 100, has an angled evaluation channel 118 that provides a fluid connection from the sensor channel 104 to a pressure chamber 120 in the sensor housing 88. The pressure chamber 120 is located in a measuring cylinder 122 in the sensor housing 88. The pressure of the unfiltered matter, which is transmitted to the pressure chamber 120 in the measuring cylinder 122 via the evaluation channel 118, loads one piston surface 124 of a measuring piston 126, which can be displaced in the measuring cylinder 122 and which is pre-loaded by a compression spring 128 against a displacement motion caused by the pressure of the unfiltered matter. For differential pressure measurement, the filtrate pressure acts on the further piston surface 130 opposite from the pressure chamber 120, of the measuring piston 126. For this purpose, the end of the measuring cylinder 122 facing away from the pressure chamber 120, is fluidically connected to the closed end 90 of the receiving space 80 via a throttling port 132, wherein in the receiving space 80 the front end 146 of the pressure sensor 82 engages. Because the closed end 90 of the receiving space 80 is offset from the center at the lid part 32, the fluid connection between the closed end 90 of the receiving space 80 and the filtrate side 28 in the interior 43 of the lid part 32 can be established by a further sensor channel 134, which extends in the form of a vertical drilled hole 136, as part of the measurement sensing device 108, starting from the receiving space 80 through the top surface of the lid part 32 via the interior 43 into the interstice 18 and there opens out into the filtrate side 28 outside of the bypass valve 58. A sensor board 138 is provided in the filter housing 14 to generate a signal based on the motions of the measurement piston 126 caused by the differential pressure using a common non-contact measurement method, such as a measurement method based on the Hall effect.

The exemplary embodiment of FIG. 3 is completely identical to the exemplary embodiment of FIG. 2, except that a dynamic pressure sensor 140 is provided in the receiving space 80, which is located on the lid part 32 and is co-delimited by the attachment 76, instead of the differential pressure sensor 86 provided for a differential pressure measurement. The sensor housing 88 of the dynamic pressure sensor 140, which is designed as a screw-in cartridge, does not have an inner channel as a measuring cylinder for a measuring piston, but only a pressure transducer 142 for a dynamic pressure measurement. Accordingly, the pressure transducer 142 is via another evaluation channel 144 and the connecting channel section 100 at the receiving space 80 directly exposed to the pressure of unfiltered matter transmitted by the sensor channel 104. Because the filtrate pressure is not taken into account in the dynamic pressure measurement and thus the further sensor channel 134 is without function, in the example of FIG. 3, the front end 146 of the sensor housing 88 is formed as a plug, which, in conjunction with the sealing ring 98, closes the connection to the further sensor channel 134.

The exemplary embodiment of FIG. 4 is largely identical to the exemplary embodiment of FIG. 3, except that a connecting piece 84 designed as a screw-in cartridge is installed in the receiving space 80, in particular screwed into the receiving space 80. By connecting piece 84, the pressure of the unfiltered matter present at the connecting piece 84, which is tapped in the filter cavity 22 via the sensor channel 104 and the connecting channel section 100, is passed on via a fluid line 150 to a dynamic pressure sensor 140 disposed at a distance from the receiving space 80 and/or from the connecting piece 84. The dynamic pressure sensor 140 in terms of its mode of operation is identical to the dynamic pressure sensor 140 of FIG. 3. For this purpose, at least two line sections 152, 154, which are aligned perpendicular with respect to each other and are interconnected in a fluid-conveying manner, are provided in the connecting piece 84, each of which line sections is introduced into the connecting piece 84 through a drilled hole, and one 152 of which, extending through the connecting piece 84 in the direction of the longitudinal axis of the filter element 16, opens out into the connecting channel section 100 of the receiving space 80 in a fluid-conducting manner, and the other 154 of which, extending through the connecting piece 84 in the direction of the longitudinal axis of the receiving chamber 80, opens out into the fluid line 150 in a fluid-conveying manner. Each of the channel sections 152, 154 may have an inner diameter enlargement, preferably in the form of a step, in the direction of its end exiting the connecting piece 84.

While various embodiments have been chosen to illustrate the invention, it will be understood by those skilled in the art that various changes and modifications can be made therein without departing from the scope of the invention as defined in the claims.

The invention claimed is:

1. A filter device, comprising:
a filter housing including a housing pot closed by a removable lid part;
a replaceable filter element being accommodated in the filter housing and having element material separating an unfiltrate chamber from a filtrate chamber in the filter housing;
a measurement sensor capable of sensing pressure values from at least one of the unfiltrate and filtrate chambers, the measurement sensor being disposed on a lid inner side of the lid part and at least partially guided in the lid part and projecting into the filter housing, at least parts of a measured value evaluator being connected to the measurement sensor and being disposed on a lid outer side facing an environment outside of the filter housing and being opposite the lid inner side, the measurement sensor having a sensor channel at least partially encompassed by a sensor tube extending coaxially with respect to a longitudinal axis of the filter element and connecting one of the one of the unfiltrate and filtrate chambers on the lid inner side to a receiving space on the lid outer side in a fluid-conveying manner, the receiving space being part of the measured value evaluator; and
a bypass valve connecting the unfiltrate chamber to the filtrate chamber when the element material of the filter element is blocked, a valve spring of the bypass valve extending between the lid inner side and a valve member of the bypass valve closing a frontal opening of the filter element in an unblocked state of the bypass valve, the sensor tube passing through the bypass valve.

2. The filter device according to claim 1 wherein
a longitudinal axis of the receiving space extends transverse to the longitudinal axis of the filter element on the lid outer side and receives a pressure sensor as part of the measured value evaluator.

3. The filter device according to claim 1 wherein
a longitudinal axis of the receiving space extends transverse to the longitudinal axis of the filter element on the lid outer side and receives a connecting piece for a pressure sensor located outside of the receiving space as part of the measured value evaluator.

4. The filter device according to claim 1 wherein
respective parts of the measured value evaluator in the receiving space are screw-in cartridges.

5. The filter device according to claim 2 wherein
the receiving space has a channel section extending parallel to a longitudinal axis of the receiving space, one free end of the sensor channel opening into the channel section and establishing a permanent connection to an evaluation channel of the pressure sensor.

6. The filter device according to claim 1 wherein
a further sensor channel is guided in the lid part, is routed in a fluid-conveying manner to an outer side of the filter element to one of the unfiltrate and filtrate chambers and can be closed if necessary.

7. The filter device according to claim 6 wherein
a lid-side end of the further sensor channel opens out into the receiving space in the lid part, a front end of a pressure sensor in the receiving space engaging into the lid-side end of the further sensor channel.

8. The filter device according to claim 1 wherein
a dynamic pressure sensor is in the receiving space.

9. The filter device according to claim 1 wherein
a differential pressure sensor is in the receiving space.

10. The filter device according to claim 8 wherein
the dynamic pressure sensor exclusively measures pressure values from the sensor channel in the unfiltrate chamber.

11. The filter device according to claim 8 wherein
the differential pressure sensor measures pressure values from both the sensor channel permanently connected to the unfiltrate chamber in a fluid-conveying manner, and
a further sensor channel is permanently connected to the filtrate chamber in a fluid-conveying manner.

* * * * *